(12) United States Patent
Bos et al.

(10) Patent No.: US 6,673,276 B1
(45) Date of Patent: Jan. 6, 2004

(54) OPHTHALMIC LENSES

(75) Inventors: William Bos, Arnhem (NL); Ricardo Henry Breeveld, Doesburg (NL)

(73) Assignee: Great Lakes Chemical Corporation, Indianapolis, IN (US)

( * ) Notice: Subject to any disclaimer, the term of this patent is extended or adjusted under 35 U.S.C. 154(b) by 0 days.

(21) Appl. No.: 09/700,480

(22) PCT Filed: Apr. 26, 1999

(86) PCT No.: PCT/EP99/03016

§ 371 (c)(1), (2), (4) Date: Jan. 26, 2001

(87) PCT Pub. No.: WO99/59791

PCT Pub. Date: Nov. 25, 1999

(30) Foreign Application Priority Data

May 15, 1998 (EP) .............................................. 98201632

(51) Int. Cl.$^7$ .............................................. B29D 11/00
(52) U.S. Cl. ........................................ 264/1.1; 351/159
(58) Field of Search ............... 264/1.1, 334; 106/38.22; 351/159, 163

(56) References Cited

U.S. PATENT DOCUMENTS 4,548,984 A * 10/1985 Misura 5,856,415 A    1/1999 Lagace et al. ............... 526/192

FOREIGN PATENT DOCUMENTS

EP         0 473 163         4/1992 ........... C08F/18/24

OTHER PUBLICATIONS

*International Search Report,* dated Aug. 31, 1999.
Abstract, JP 09241336–A, dated Sep. 16, 1997.
Abstract, JO 3287641–A, dated Dec. 18, 1991.
F. Albert Cotton and Geoffrey Wilkinson, Basic *Inorganic Chemistry,* pp. 3.
*Encyclopedia of Chemical Technology, Alkoxides, Metal To Antibiotice* (*Peptides*), Third Edition, vol. 2, pp. 3.

* cited by examiner

*Primary Examiner*—Mathieu D. Vargot
(74) *Attorney, Agent, or Firm*—Baker & Daniels

(57) ABSTRACT

The present invention relates to the use of metal organic compounds in a process for providing a moulded plastic article comprising the step of polymerization casting of a curable composition comprising one or more polymerizable molecules or compounds or compositions in the presence of a mould release agent, which in turn comprises a metal organic compound, complexes and/or salts thereof. Such use leads to less surface defects of the moulded article and lower mould damage.

24 Claims, 1 Drawing Sheet

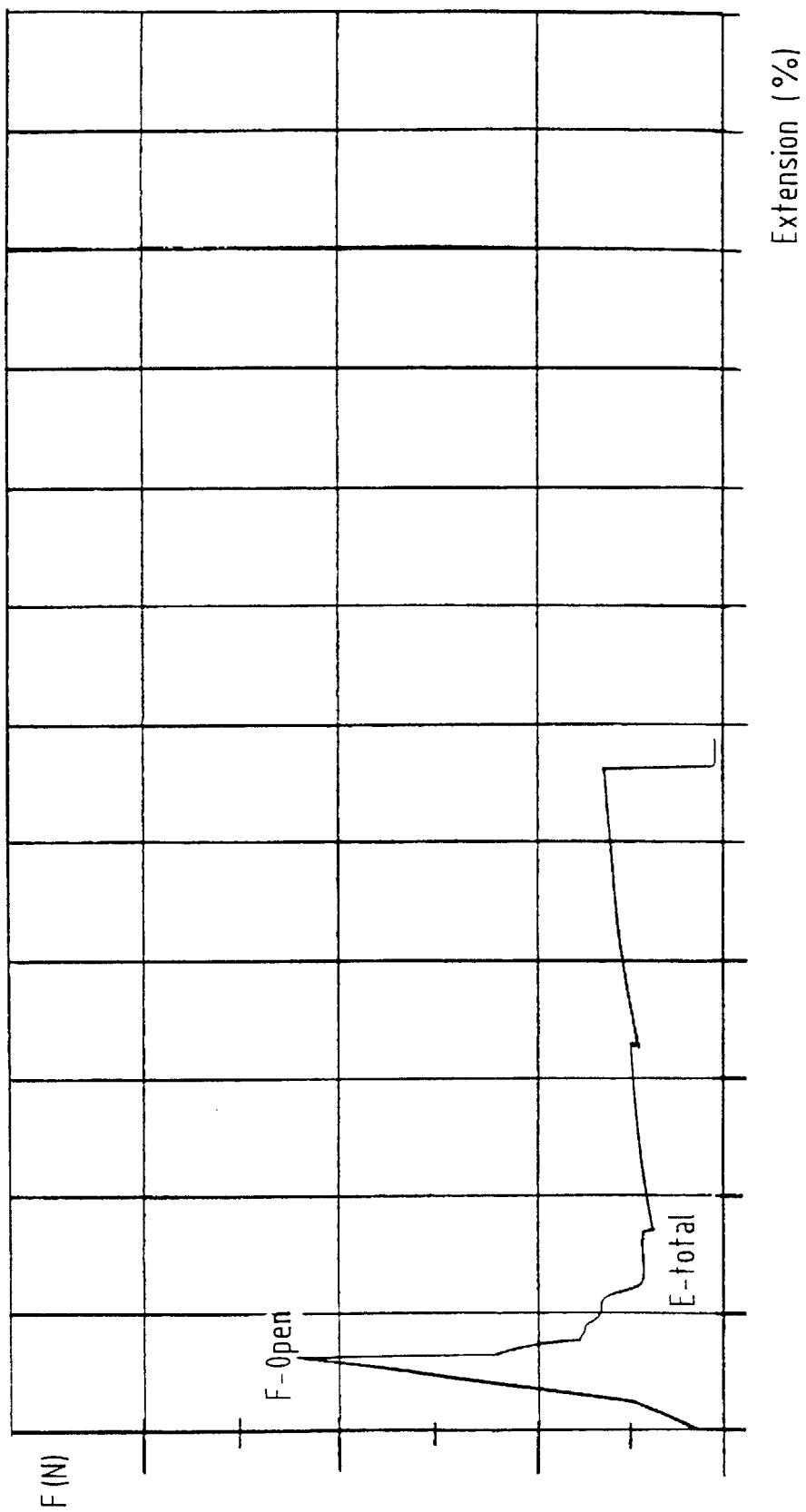

OPHTHALMIC LENSES

The present invention relates to a process for providing molded plastic articles, in particular ophthalmic lenses, plastic articles and ophthalmic lenses themselves, and the use of metal organic compounds in such processes.

Recently, organic glass has begun to replace inorganic glass in optical elements, such as windows, prisms, cameras, television screens, telescopes, and ophthalmic lenses. The term ophthalmic lenses refers to corrective lenses as well as non-corrective lenses such as sunglasses. Organic glass possesses several favourable characteristics, including a lighter weight and better safety, e.g., better impact resistance, than inorganic glass.

Conventional materials used in organic glass include polystyrene resin, polymethyl methacrylate resin, and polycarbonate resin. However, these polymers have their respective disadvantages. For example, polymethyl methacrylate resin is liable to high moisture absorption, which changes its shape and refractive index. Also, polystyrene resin and polycarbonate resin have the disadvantage of giving rise to birefringence, light scattering, and loss of transparency with time. Furthermore, polymethyl methacrylate and polystyrene are neither scratch nor solvent resistant.

Organic glass made up of the products of the radical polymerization of poly(allyl carbonates) of polyhydroxy alcohols is also known, for example from European patent application 0 473 163. These polymers do not have the above-mentioned problems. However, when applying poly(allyl carbonates) of polyhydroxy alcohols in ophthalmic lenses increased mould damage occurs. Understood by mould damage is the damage incurred in a lens or in a mould on opening of the mould wherein the lens is formed.

Another known problem of such lenses is the occurrence of a surface defect of the casted organic glass that is known as "ferns". The defects are called this way because they always appear in the shape of a fern leaf. The exact nature of these ferns and how they are being formed is unknown, but since the size of such ferns can vary from 0.5 to 30 cm$^2$, they pose a real problem. It is possible to remove said ferns from the surface by polishing, however, such a process is undesired.

A further known problem is the uneven tinting of casted lenses with a colouring agent by means of a process of imbibing the lens, such processes being well-known in the art. The fact that the lens is coloured unevenly, may be associated with surface defects as well. A process wherein lenses are coloured more evenly is desired.

The Japanese patents JP 238151 and JP 09241336 teach the use of phosphorous compounds (phosphorous being a group 15 element according to the new IUPAC notation, with an electronegativity of about 2.1) as mould release agents. Common release agent present a number of problems when applied in the manufacturing of optical articles such as ophthalmic lenses. They regularly require high amounts to be effective and thereby negatively effect the mechanical and optical performance of the casted material. Furthermore they negatively affect the surface tension of the polymer, making the application of a coating (anti-scratch or other coating) and evenly tinting very difficult and its performance unreliable.

WO 96/24865 from the applicant teaches the use of diallyl phthalate type oligomers in curing compositions for ophthalmic lenses whereby mould damage in the production of said lenses is reduced.

Moulds used in today's industry to prepare ophthalmic lenses from poly(allyl carbonate) of a polyhydroxy alcohol are only suited for compositions which result in ophthalmic lenses with identical refractive indices. A change in refractive index will result in a change in power of the lens when utilizing these moulds. Compositions resulting in higher refractive index lenses will require different moulds to obtain ophthalmic lenses with the same power. So, improvement of the properties of lenses by introducing certain oligomers and, optionally, comonomers cannot be achieved without limiting the refractive index of the resulting lens so that the moulds do not have to be changed.

An object of the present invention is to provide a process for providing moulded plastic articles whereby the mould damage, the occurring of ferns (ferning) and other tinting failures are being reduced.

The present invention relates to a process for providing a moulded plastic article comprising the step of polymerization casting of a curable composition comprising one or more polymerizable molecules or compounds which are preferably radically polymerizable and are preferably monomers, co-monomers and/or oligomers, for example poly(allyl carbonates) of polyhydroxy alcohols and methacrylic, acrylic, vinylic or allylic comonomers, in the presence of a mould release agent, which in turn comprises a metal organic compound, complexes and/or salts thereof, with the proviso that the metal of the metal organic compound is not Si or P. It is understood that the term metal as used here also includes transition elements. Furthermore it is noted that the term "radical polymerizable monomers" does not comprise conventional monomers that lead to urethane formation. Preferably, the invention relates to the process in which essentially all monomers are radically polymerizable. More preferably, the process involves the polymerization of a composition which consists essentially of radically polymerizable monomer(s), initiator(s), tinting agent(s), and the metal organic compound.

The mould damage, and ferns or other tinting failures in the production of the ophthalmic lens according to the present invention by using the claimed metal organic compounds is reduced without adversely affecting mechanical and/or optical properties of the optical articles, such as hardness and refractive index. Furthermore these metal organic release agents do not substantially negatively effect the surface tension of the polymer and monomer, and hence do not substantially negatively effect the adhesion of (anti-scratch) coatings onto the polymer surface. Preferred metal organic compounds are selected from organometallic compounds, complexes of metals, metal salts, and metal soaps. Most preferred are organometallic compounds wherein the metal is covalently bonded. The valency of the metal will typically vary from 1–6, a valency of 2–6 being preferred. Preferred metal organic compounds are of the formulae 1–111

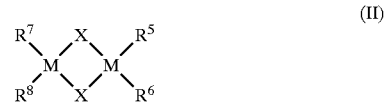

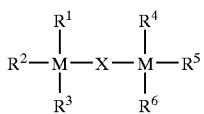

(III)

wherein M is the metal as defined, X=O or S, and $R^1$–$R^8$ are independently selected from the group consisting of hydrogen, halogen, hydrocarbyl, halogen substituted hydrocarbyl, and

wherein $R^9$ is $C_2$–$C_{22}$ hydrocarbyl, preferably $C_{4-12}$ hydrocarbyl, and X has the meaning as defined above, whereby $R^1$–$R^8$ are optionally connected to form a ring structure.

Preferred compounds have a structure wherein $R^1$–$R^8$ are independently selected from essentially hydrogen, halogen, octoate, laurate, butyl, hexanoate, and decanoate. More preferred compounds are dibutyl metal dilaurates, dibutyl metal oxides, and metal 2-ethylhexanoates (octoates).

Without wishing to be bound to such theory, it appears that the electronegativity of the metal is an important factor for selecting metal organic compounds that are useful in the process according to the invention. Using the table of electronegativity of elements as calculated according to Allred & Rochow and as published in the textbook by Cotton & Wilkinson in *Basic Inorganic Chemistry*, ISBN# 0471-50532 3, Table 2–3, as a reference, the preferred metal of the metal organic compound has an electronegativy from 1.5 to 1.75. More preferred metals have an electronegativity, as calculated by Allred & Rochow's method, of 1.6 to 1.73. Most preferred metals are Zn, Sn, and Co.

If used to produce ophthalmic lenses, the metal organic release agents must be completely soluble in the monomer to prevent the reduction of transmission of the lens.

The inventors have noted that the claimed metal organic compounds express release agent activity even at very low concentration, and are suitable as both internal, i.e. present in the polymerizable composition, release agents and external, i.e. applied directly to the mould, release agents. Preferably, the metal organic compounds are used as an internal release agent If used as an external release agent, they may be applied to the mould prior to lens casting, for example, by any suitable methods such as spraying or dipping, either in the concentrated form, or as a solution in a solvent. Typically, if applied as a solution, the solvent is allowed to evaporate before the mould is actually used in the casting process.

If used as an internal release agent, the metal organic compounds can be introduced in the polymerizable composition in the pure form or as dissolution in a suitable medium. Such suitable medium is typically one monomer, or a mixture of monomers, to be used in the polymerizable composition. Although it is possible to combine the pure metal organic compound with other compounds (in the pure form) that are to be used in the composition, such as e.g. the initiator or the colouring agent, this is typically not desired since the metal organic compounds may have a destabilizing effect on such compounds, which may lead to hazardous situations. Preferably, the metal organic compounds are introduced into the polymerizable composition in the pure form or in the form of said dissolution in one or more monomers. For accurate dosing it is preferred to use a solution of the metal organic compound with a concentration of 0.001 to 50% w/w. More preferably 0,01 to 25% w/w, and even more preferably 0.05 to 20% w/w. Such solutions may supply all of the monomer to be polymerized, or, preferably, be combined with further monomer.

The metal organic compounds according to the invention are not meant to be used as radiation shielding compounds as described in, for instance, U.S. Pat. No. 5,856,415. Whereas radiation shielding compounds are typically used in an amount of greater than 15% by weight (% w/w) in order to be effective, the mould release agents are typically used in lower concentration. More preferably they are used in a concentration of less than 10% w/w, while most preferably they are used in an amount of less than 5% w/w. All based on the weight of the final lens.

Preferably, the metal organic compounds are used in such a quantity that the surface tension of the finished product is about equal to the surface tension of the mould that is used. More preferably, the surface tension of the mould is less than 37 mN/m to prevent the defects as described above from occurring. In case the casting composition is used in the casting of ophthalmic lenses using glass moulds, it is preferred to use the metal organic release agent in an amount such that the maximum required force to open the mould is 200N or less. More preferably, the required mould opening force is less than 90N, while a maximum force of 80N is most preferred. Another way to establish the desired amount of metal organic compounds in the ophthalmic lens casting process is by evaluation of the demoulding energy that is released upon opening of the mould. Preferably, the amount is chosen such that the demoulding energy is less than 0.15 Nm, more preferably less than 0.1 Nm. Typically the metal organic compound is used in a quantity from 0.0001 (1 ppm) to 5% w/w, more preferably 0.001 to 2% w/w, even more preferably 0.002 to 1% w/w, and most preferably 0.0025 to 1% w/w, based on the total weight of the casted composition.

The radical polymerizable molecules or compounds can be generally polymerized by either a method in which the polymerization is accomplished with heat or a method in which the polymerization is accomplished with light. As radical polymerizable monomers there can be used any widely known monomer having a radical polymerizing group without limitation.

Further radically polymerizable monomers may optionally be present in the curable composition up to 20% w/w. These comonomers may be methacrylic, acrylic, vinylic or allylic. Examples include methyl acrylate, methyl methacrylate, phenyl methacrylate, vinyl acetate, vinyl benzoate, diallyl isophthalate, diallyl terephthalate, diallyl adipate, and triallyl cyanurate.

The compositions of the present invention will typically contain a polymerization initiator in quantities ranging from 0.01 to 10 wt % as is known in the art. This initiator should be soluble in the other components present in the composition to be cured and capable of producing free radicals at a temperature which ranges from 30° to approximately 100° C. Examples of such initiators are organic peroxide and percarbonate initiators, especially diisopropyl peroxydicarbonate, dicyclohexyl peroxydicarbonate, di-sec-butyl peroxydicarbonate, dibenzoyl peroxide, tert-butyl perbenzoate, benzoyl peroxide, lauryl peroxide, azobis(isobutylonitrile) and azobis(2,4di-methylvaleronitrile). For the purpose of the present invention, it is preferable for the polymerization initiator to be present in the composition in quantities from about 1 to 8% w/w The initiators can be used either singly or in combination of two or more.

The curing of the polymerizable composition of the present invention can also be conducted by using a conventional photo polymerization initiator. As the photo polymerization initiator, any widely known compound can be used without limitation that is added for photopolymerizing the radical polymerizable monomers. Examples of the photopolymerization initiator that can be used in the present invention are Acetophenone initiators, such as 1-phenyl-2-hydroxy-2-methylpropane-1-one, hydroxycyclohexylphenyl ketone; Acylphosphine oxide initiators such as 2, 4, 6-trimethylbenzoyidiphenylphosphine oxide, 2,6-dichlorobenzoyidiphenyl-phospineoxide; Bisacylphosphine oxide initiators and dicarbonyl compounds.

The poly(allyl carbonates) of polyhydroxy alcohols may be used in the form of either monomers or oligomers and are of the conventional type. Monomers are usually obtained by using chloroformates. In this way, diethylene glycol diallyl carbonate can be obtained by reacting diethylene glycol bis(chloroformate) with allyl alcohol in the presence of an alkali, as described in Kirk-Othmer, *Encyclopedia of Chemical Technology*, 3rd ed., John Wiley & Sons, 1978, Vol. 2, p. 111. Monomers and oligomers of poly(allyl carbonates) of polyhydroxy alcohols can also be suitably obtained by means of transesterification reactions between diallyl carbonate and a polyhydroxy alcohol, as described in European patent application 0 035 304. In this way, monomers or mixtures of monomers and oligomers can be obtained, depending on the ratio of diallyl carbonate reagents to polyhydroxy alcohol. It is also possible to obtain mixed poly(allyl carbonates) of polyhydroxy alcohols by reacting a diallyl carbonate with a mixture of polyhydroxy alcohols in a transesterification reaction. These mixed poly(allyl carbonates) of polyhydroxy alcohols are also included in the present invention. Monomers of poly(allyl carbonates) of potyhydroxy alcohols are preferred for the ophthalmic lens of the present invention.

The polyhydroxy alcohols used in the preparation of poly(allyl carbonates) of polyhydroxy alcohols contain from 2 to 20 carbon atoms and from 2 to 6 hydroxy groups in the molecule. Examples of these alcohols are: ethylene glycol, diethylene glycol, triethylene glycol, tetraethylene glycol, 1,3-propylene glycol, 1,4-butanediol, 1,6-hexanediol, neopentyl glycol, 2,2,4-trimethyl-1,3-pentanediol, 1,4-dimethanol cyclohexane, 4,8-bis(hydroxyethyl) tricyclo(5, 2,1 ,0$^{2,6}$)decane, α,α'-xylenediol, 1,4-bis(hydroxyethyl) toluene, 2,2-(bis(4-hydroxyethyl)phenyl) propane, pentaerythritol, trimethylol propane, dipentaerythritol, ditrimethylol propane, and tris(hydroxyethyl) isocyanurate. The following polyhydroxy alcohols are preferred: diethylene glycol, 1,4-dimethanol cyclohexane, pentaerythritol, and tris(hydroxyethyl) isocyanurate.

Examples of the diol include ethylene glycol, 1,2-propylene glycol, 1,4-butanediol, 1,6-hexanediol, 1,4-dimethanol cyclohexane, 1,3-butanediol, neopentyl glycol, 1,3-cyclohexanediol, p-xylene glycol, and styrene glycol, and other aliphatic and aromatic diols. Branched diols are preferable to linear ones. Examples of such branched diols include 1,2-propylene glycol, 1,3-butanediol, neopentyl glycol, 2,3-butanediol, 1,4-pentanediol, 1,3-pentanediol, 1,2-pentanediol, 2,3-pentanediol, 2,4-pentanediol, 1,5-hexanediol, 1,4-hexanediol, 1,3-hexanediol, 1,2-hexanediol, 2,3-hexanediol, 2,4-hexanediol, 2,5-hexanediol, and 3,4-hexanediol.

Examples of the polyols include aliphatic trihydric alcohols, such as glycerine and trimethylol propane, and aliphatic polyhydric alcohols, such as pentaerythritol and sorbitol.

Examples of polymerizable monomers that can favorably be used in the present invention include the following compounds of the conventional type.

That is, polyfunctional acrylate or methacrylate, such as diethylene glycol dimethacrylate, triethylene glycol dimethacrylate and 2,2-bis(4-methacryloyloxyethoxyphenyl)propane. Examples of other radical polymerizable monomers include unsaturated carboxylic acids such as (meth)acrylic acid, maleic anhydride, (meth)acrylic ester compounds such as methyl(meth)acrylate, benzyl(meth)acrylate, bisphenol-A di(meth)acrylate, urethane (meth)acrylate and epoxy(meth)acrylate; allyl compounds such as diallyl phthalate, diallyl terephthalate, diallyl carbonate and allyl diglycol carbonate; aromatic vinyl compounds such as styrene, α-methylstyrene, vinyl naphthalene, and divinylbenzene; cyclohexyl diallyl ester oligomers, diallyl phthalate ester oligomers, and diallyl terephthalate ester oligomers. These monomers may be used in a single kind or being mixed together in two or more kinds.

For the production of ophthalmic lenses it is preferred to use a casting composition resulting in a lens with a refractive index of 1.45 to 1.55, more preferably 1.48–1.52, most preferably about 1.5.

The composition may also contain one or more conventional additives to act as ultraviolet light absorbers, dyes, pigments, and/or infrared light absorbers.

FIG. 1 is a tensile-elongation diagram with the force necessary to pull two glass plates away from each other plotted against percentage of extension.

The invention will be further illustrated by the following examples.

Mould damage occurs by adhesion of the cured polymer to the glass mould. It is possible to measure the adhesion of the cured polymer to the glass with the aid of a tensile tester. To this end a monomer composition is polymerized between two parallel, degreased glass plates, having dimensions of 30×8 cm which are held together with a PVC-ring. After polymerization, the PVC-ring is removed and the top glass plate is pulled loose on the short side on the tensile tester at 60° C. This gives a tensile-elongation diagram as shown in the accompanying FIG. 1, with the force necessary to pull the two glass plates way from each other plotted against the percentage of extension.

A good parameter for the adhesion to the glass mould is the overall release energy (E-total). This is the surface area under the above-mentioned diagram.

Examples 1 to 6 and Comparative Examples A to G

A clear homogeneous solution was obtained by mixing diethyleneglycol bisallyl carbonate (Nouryset 2000® ex. Akzo Nobel), organometallic compounds and 2.7% w/w of diisopropyl peroxy dicarbonate (IPP), the whole mixture being 100%. The mixture was degassed at 20 mbar for 15 minutes until gas evolution stopped. The glass mould assemblies were filled with the mixture. Polymerization took place in an oven with a polymerization cycle of 21 hours at a temperature rising exponentially from 45° to 80° C.

In comparative Examples B to G instead of the organometallic compounds, Lauric acid or Zelec® UN, a commercially available phosphate ester release agent for thermosetting applications ex DuPont, were used.

Table 1 lists the compositions which have been polymerized, mentioning the amount of organometallic compound present in the composition and the properties of the resulting lenses, Barcol hardness, the F-open (Fmax), the E-total (Etot) and the Tinting hardness. Throughout the examples the amount as specified is the amount of the indicated compound based on the total weight of the composition.

TABLE 1 examples according to the present invention:

| Lens | Metallic compound | Amount (ppm) | Fmax (N) | Etot (N) | Barcol hardness (%) | Tinting hardness (%) | Tinting failure (%) |
|---|---|---|---|---|---|---|---|
| A | none | 0 | 129 | 0.25 | 31 ± 2 | 45 ± 3 | 30–50% |
| 1 | DBTL | 160 | 58 | 0.020 | 30 ± 2 | 43 ± 2 | not measured |
| 2 | DBTO | 40 | 76 | 0.020 | 31 ± 2 | 49 ± 2 | not measured |
| 3 | Sn-octoate | 160 | 88 | 0.11 | not measured | 47 ± 2 | not measured |
| 4 | DBTL | 40 | 70 | 0.040 | 30 ± 2 | 41 ± 2 | not measured |
| 5 | DBTL | 20 | 79 | 0.070 | 30 ± 2 | 42 ± 2 | not measured |
| 6 | DBTL | 10 | 86 | 0.080 | 30 ± 2 | 45 ± 2 | not measured |
| 7 | DBTL | 90 | | | | | 0–6% |

Key to table 1:
DBTO — Di butyl tin oxide (Tegokat ® 248 ex Goldschmidt)
DBTL — Di butyl tin dilaurate (Tegokat ® 218 ex Goldschmidt)
Sn-octoate — Tegokat ® 129 ex Goldschmidt

Tinting Hardness

A useful method for the measurement of the hardness of optical polymers is the standard tinting test. To tint a sample, 1.51 g Terasil® Rot R is dissolved in 800 ml demineralized water. The (blanco) transmission of a test piece at 500 nm is measured. Then the test piece is immersed during 4 minutes in the tinting bath at 92–94° C. after which the sample immediately is dipped in cold water to stop the pigment impregnation completely. After cleaning the test piece with EtOH, the transmission of the test piece after tinting is measured at 500 nm. The tinting hardness is now calculated according to the following formula:

$T_n=(T_i/T_b)* 100\%$ $T_n$=tinting hardness (%)

$T_b$=transmission at 500 nm of test piece before tinting $T_i$=transmission at 500 nm of test piece after tinting The results in Table 1 for E-total show that the lenses comprising the compositions of the present invention will result in a significant reduction of demoulding energy, and hence a reduction of mould damage, even at very low concentration of organometallic compound without adversely affecting other properties such as Barcol hardness and Tinting hardness.

Tinting failures are seen when tinted lenses exhibit so called "white arches" and "ferns", defects which seriously impair the quality of the lenses.

The results in table 2 show that the organometallic compounds will not negatively effect the coatability of the (polymer) lens, because they do not negatively influence the surface tension of polymer. Furthermore, organometallic compounds decrease the surface tension of the glass mold, thereby facilitating the demoulding process.

TABLE 2

Examples according to the present invention:

| Lens | Metallic compound | Amount (ppm) | Lens Surface tension (mN/m) | Glass mould Surface tension (mN/m) |
|---|---|---|---|---|
| A | none | 0 | 37 ± 2 | 47 ± 2 |
| 1 | DBTL | 160 | 35 ± 2 | 33 ± 2 |
| 2 | DBTO | 40 | 35 ± 2 | 35 ± 2 |

Comparative Examples B to G

Compositions were prepared according to the procedure mentioned in

Examples 1 to 6. The results are listed in Table 3.

TABLE 3

Comparative examples

| Lens | Compound | Amount (ppm) | Fmax (N) | Etot (Nm) |
|---|---|---|---|---|
| B | Lauric acid | 40 | 111 | 0.21 |
| C | Lauric acid | 20 | 108 | 0.23 |
| D | Lauric acid | 10 | 109 | 0.24 |
| E | Zelec UN | 100 | 70 | 0.090 |
| F | Zelec UN | 50 | 79 | 0.14 |
| G | Zelec UN | 25 | 86 | 0.16 |

The results in Table 3 show that common release agents (Zelec UN) are less effective as release agent than the organometallic compounds of the present invention. Furthermore, it is also shown that the organo part of an organometallic compound (lauric acid) by itself does not express release agent properties.

Examples 8–10 and Comparative Example H

In the process as described for Example 1, various metal organic release compounds were evaluated with the following results:

| Example | Compound | Amount (ppm) | Fmax (N) | Etot (N) | Barcol hardness | T (%) |
|---|---|---|---|---|---|---|
| H | none | — | 124–144 | 0.27–0.30 | 34 ± 2 | 93.2 |
| 8 | Zn-octoate | 140 | 58 | 0.03 | 32 ± 2 | 93.0 |
| 9 | Mn-octoate | 30 | 113 | 0.26 | 31 ± 2 | 93.1 |
| 10 | Co-octoate | 30 | 93 | 0.23 | 35 ± 2 | 92.4 |

T = transmittance
Zn-octoate = Zn-2-ethylhexanoate (Durham ®-Zinc (2) ex Elementis)
Mn-octoate = Mn-2-ethylhexanoate (Durham ®-Manganese ex Elementis)
Co-octoate = Co-2-ethylhexanoate (Durham ®-Cobalt ex Elementis)

Clearly, these metal organic compounds improve the demoulding of the lens from the mould.

Example 11 and Comparative Example I

In a process according to example 1, the amounts of ferns in casted lenses were evaluated. When no metal organic compound was used, about 40% of all lenses possessed ferns. However, using 50–100 ppm (0.005–0.01% w/w) of DBTL resulted in a reduction of ferns so that less than about 10% of all lenses contained ferns.

Example 12–16

In the process of Example 1, further tin compounds were evaluated with the following results:

| Example | Compound | Amount (ppm) | Fmax (N) | Etot (N) | Barcol hardness | T (%) |
|---|---|---|---|---|---|---|
| H | none | — | 124–144 | 0.27–0.30 | 34 ± 2 | 93.2 |
| 12 | DBSnDA | 238 | 45 | 0.01 | 31 ± 2 | 93.0 |
| 13 | BSnTO | 225 | 69 | 0.04 | 34 ± 2 | 93.2 |
| 14 | MBSnO | 141 | 96 | 0.19 | 33 ± 2 | 93.0 |
| 15 | TASn | 107 | 80 | 0.18 | 32 ± 2 | 93.0 |
| 16 | EncDBTDL | 222 | 61 | 0.08 | 34 ± 2 | 91.3 |

T = transmittance
DBSnDA = Dibutyltindiacetate (Tegokat ® 233 ex Goldschmidt)
BsnTO = Butyltintris(2-ethylhexanoate)(Tegokat ® 220 ex Goldschmidt)
MBSnO = Monobutyltinoxide(Tegokat ® 256 ex Goldschmidt)
TASn = Tetraallyltin (ex Aldrich)
EncDBTDL = Encapsulated DBTDL (Intelimer ® 5012 ex Landec)

The use of the compounds led to improved demoulding and less surface defects such as ferning and uneven tinting. Various other tin compounds were evaluated with similar results, demonstrating that it is the metal that is decisive in obtaining the desired positive effects in the casting operations. The organic part of the metal organic compound, however, may be optimized to increase performance. Most likely this is related to the differences in solubility in the total composition because of the differences in organic groups.

The invention is not limited to the above description, the requested rights are rather determined by the following claims.

What is claimed is:

1. A process for preparing ophthalmic lenses comprising the steps of:

polymerizing a polymerizable composition in the presence of a mould release agent in a casting mould; the mould release agent comprising at least one of: a metal organic compound, a metal organic complex, and a salt thereof, wherein the metal of the mould release agent has an electronegativity of 1.5 to 1.75, when calculated according to the method of Allred and Rochow, and is not Si or P;

opening the casting mould to release an ophthalmic lens; and imbibing the ophthalmic lens, after releasing from the casting mold, in a tinting solution to recover a tinted ophthalmic lens substantially free of surface defects including ferns and tinting failures.

2. The process according to claim 1, wherein the mould release agent is used in an amount sufficient to lower the force required to open the mould to less than 200N.

3. The process according to claim 1, wherein the mould release agent is used in an amount of 0.0001 to 1% by weight, based on the weight of a total composition.

4. The process according to claim 1, wherein the metal organic compound is selected from the group consisting of the formula I–III:

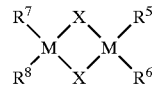

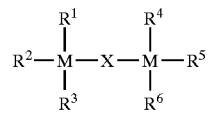

wherein M is the metal as defined, X=O or S, and $R^1$–$R^8$ are independently selected from the group consisting of hydrogen, halogen, hydrocarbyl, halogen substituted hydrocarbyl, and

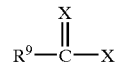

wherein $R^9$ is $C_2$–$C_{22}$ hydrocarbyl, and X has the meaning as defined above, whereby $R^1$–$R^8$ are optionally connected to form a ring structure.

5. The process according to claim 4, wherein $R^1$–$R^8$ of the metal organic compound are selected from the group consisting of octoate, laureate, butyl, hexanoate, and decanoate and wherein the metal (M) is Sn or Zn.

6. The process according to claim 1, wherein the metal organic compound is selected form the group consisting of dibutyl metal dilaurates, dibutyl metal oxides, and metal 2-ethylhexanoates (octoates).

7. An ophthalmic lens obtainable according to the process of claim 1.

8. The process according to claim 1, wherein the metal of mould release agent has an electronegativity of 1.6 to 1.73 when calculated according to the method of Allred and Rochow.

9. The process according to claim 1, wherein the mould release agent is used in an amount sufficient to lower the force required to open the mould to less than 90 N.

10. The process according to claim 1, wherein the mould release agent is used in an amount sufficient to lower the demoulding energy that is released upon opening of the mould to less than 0.15 Nm.

11. The process according to claim 1, wherein the mould release agent is used in an amount sufficient to lower the demoulding energy that is released upon opening of the mould to less than 0.10 Nm.

12. The process according to claim 1, further comprising the step of adding the mould release agent in the polymerizable composition prior to the polymerizing step.

13. The process according to claim 1, further comprising the step of applying the mould release agent in the mould prior to the polymerizing step.

14. The process according to claim 1, wherein the mould is made of glass.

15. The process according to claim 4, wherein $R^9$ is $C_{4-12}$ hydrocarbyl.

16. A process for preparing ophthalmic lenses comprising the steps of:

polymerizing a polymerizable composition in the presence of a mould release agent in a casting mould; the mould release agent comprising a metal organic compound, wherein the metal of the mould release agent has an electronegativity of 1.5 to 1.75, when calculated according to the method of Allred and Rochow, and is not Si or P, wherein the metal organic compound is selected from the group consisting of the formula I–III:

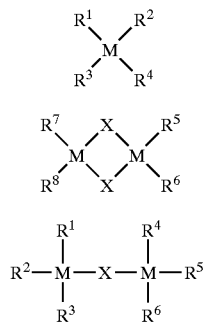

wherein M is the metal as defined, X=O or S, and $R^1$–$R^8$ are selected from the group consisting essentially of hydrogen, halogen, octoate, laureate, butyl, hexanoate, and decanoate, and releasing an ophthalmic lens from the casting mould.

17. The process according to claim 16, wherein the metal (M) is Sn or Zn.

18. The process according to claim 16, wherein the metal organic compound is selected form the group consisting of dibutyl metal dilaurates, dibutyl metal oxides, and metal 2-ethylhexanoates (octoates).

19. The process according to claim 16, wherein the mould release agent is added to the casting mould, prior to the polymerizing step.

20. The process according claim 16, wherein the mould release agent is added to the polymerizable composition, prior to the polymerizing step.

21. The process according to claim 16, wherein the mould release agent is used in an amount of 0.0001% to 1% by weight, based on the weight of a total composition.

22. The process according to claim 16, wherein the mould is made of glass.

23. The process according to claim 16, further comprising the step of imbibing the ophthalmic lens in a tinting solution to recover a tinted ophthalmic lens substantially free of surface defects including ferns and tinting failures.

24. An ophthalmic lens obtainable according to the process of claim 16.

* * * * *